United States Patent
Nema et al.

(10) Patent No.: US 9,134,997 B2
(45) Date of Patent: Sep. 15, 2015

(54) METHODS FOR ASSESSING DELIVERABLE PRODUCT QUALITY AND DEVICES THEREOF

(75) Inventors: Manish Kumar Nema, Pune (IN); Jigar Mehta, Pune (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 13/599,330

(22) Filed: Aug. 30, 2012

(65) Prior Publication Data

US 2013/0061202 A1 Mar. 7, 2013

(30) Foreign Application Priority Data

Sep. 5, 2011 (IN) .......................... 3048/CHE/2011

(51) Int. Cl.
*G06F 9/44* (2006.01)
*G06Q 10/06* (2012.01)
*G06F 11/36* (2006.01)

(52) U.S. Cl.
CPC ............ *G06F 8/70* (2013.01); *G06Q 10/06395* (2013.01); *G06F 8/73* (2013.01); *G06F 8/77* (2013.01); *G06F 11/368* (2013.01)

(58) Field of Classification Search
CPC ................................................ G06F 8/70–8/77
USPC .................................................. 717/100–101
See application file for complete search history.

(56) References Cited

U.S. PATENT DOCUMENTS

| | | | |
|---|---|---|---|
| 4,887,206 A | 12/1989 | Natarajan | |
| 7,103,871 B1 | 9/2006 | Kirkpatrick et al. | |
| 7,337,124 B2 * | 2/2008 | Corral | 705/7.17 |
| 7,610,257 B1 | 10/2009 | Abrahams | |
| 8,296,724 B2 * | 10/2012 | Lindley | 717/104 |
| 8,458,650 B2 * | 6/2013 | Andrade et al. | 717/106 |
| 8,578,341 B2 * | 11/2013 | Bassin et al. | 717/130 |
| 2005/0015675 A1 * | 1/2005 | Kolawa et al. | 714/38 |
| 2005/0071807 A1 * | 3/2005 | Yanavi | 717/104 |
| 2008/0033700 A1 | 2/2008 | Kano et al. | |
| 2008/0082957 A1 * | 4/2008 | Pietschker et al. | 717/101 |
| 2008/0092108 A1 * | 4/2008 | Corral | 717/101 |
| 2008/0263507 A1 * | 10/2008 | Chang et al. | 717/104 |
| 2009/0313605 A1 * | 12/2009 | Ostrand et al. | 717/124 |
| 2010/0057693 A1 * | 3/2010 | Himstedt et al. | 707/3 |
| 2010/0162200 A1 * | 6/2010 | Kamiyama et al. | 717/101 |
| 2010/0179927 A1 | 7/2010 | Meher et al. | |
| 2010/0180259 A1 * | 7/2010 | Lindley | 717/124 |
| 2010/0191952 A1 | 7/2010 | Keinan | |

(Continued)

OTHER PUBLICATIONS

Arora, Ashish, et al., "Research Note: Sell First, Fix Later: Impact of Patching on Software Quality", 2006, pp. 465-471.*

(Continued)

*Primary Examiner* — Thuy Dao
*Assistant Examiner* — Christopher Franco
(74) *Attorney, Agent, or Firm* — LeClairRyan, a Professional Corporation

(57) ABSTRACT

A method, non-transitory computer readable medium, and apparatus that quantitatively assesses the impact of a project change request to software quality including determining at least one initial project request defect value based on an initial project request effort value and a defect insertion rate, determining at least one project change request defect value based on a project change request effort value and the defect insertion rate, comparing at least one project change request defect value to at least one initial project request defect value, and providing a quality impact value based on the result of the comparison.

12 Claims, 6 Drawing Sheets

(56) References Cited

U.S. PATENT DOCUMENTS

| | | | |
|---|---|---|---|
| 2011/0066890 A1* | 3/2011 | Bassin et al. | 714/37 |
| 2011/0067005 A1* | 3/2011 | Bassin et al. | 717/127 |

OTHER PUBLICATIONS

Koru, A. Gunes, et al., "Building Effective Defect-Prediction Models in Practice", 2005, pp. 23-28.*

Aberdour, Mark, "Achieving Quality in Open Source Software", 2007, pp. 58-64.*

Luijten, Bart, et al., "Faster Defect Resolution with Higher Technical Quality of Software", 2010, pp. 1-10.*

Hearty, Peter, et al., "Automated Population of Causal Models for Improved Software Risk Assessment", 2005, pp. 433-434.*

Hong, Youngki, et al., "A Value-Added Predictive Defect Type Distribution Model based on Project Characteristics", 2008, 469-474.*

Nurmuliani, N. et al., "Analysis of Requirements Volatility During Software Development Life Cycle", Software Engineering Conference, 2004. Proceedings. pp. 28-37 (2004).

Zowghi, D. et al., "A Study of the Impact of Requirements Volatility on Software Project Performance", Software Engineering Conference, 2002. Ninth Asia-Pacific, pp. 3-11 (2002).

Clark, B. et al., "How Good is the Software: A Review of Defect Predition Techniques", Carnegie Mellon University, Software Engineering Symposium 2001, pp. 1-35 (2001).

Stark, G. E., et al., "An Examination of the Effects of Requirements Changes on Software Maintenance Releases", J Softw. Maint: Res. Pract., 11: 293-309 (1999).

Malaiya Yashwant, K. et al., "Requirements Volatility and Defect Density," 10th International Symposium on Software Reliability Engineering, pp. 285 (1999).

* cited by examiner

| Project # | | | | | | | | | |
|---|---|---|---|---|---|---|---|---|---|
| Initial approved effort | 10000 | | | | | | | | |
| PCR details | | IPR Status | Stages performed | | | | | | |
| | | | HLD review | DLD review | Code review | UT | IT | ST | UAT |
| PCR 1 effort | 2500 | Coding | Y | Y | Y | Y | 0.5 | 0 | 0 |
| PCR 2 effort | 2000 | Reqmnts | Y | Y | Y | N | 0 | 0 | 0 |
| PCR 3 effort | | | | Y | Y | Y | 1 | 0 | 0 |
| PCR 4 effort | | | | | | | | | |
| PCR 5 effort | | | | | | | | | |
| PCR 6 effort | | | | | | | | | |
| PCR 7 effort | | | | | | | | | |
| PCR 8 effort | | | | | | | | | |
| PCR 9 effort | | | | | | | | | |
| Total Effort | 14500 | | | | | | | | |

| PCR NAME | Rec. |
|---|---|
| Reuse Code X | Denied |
| Include Funct. X | Approved |
| | |
| | |
| | |
| | |
| | |
| | |
| | |

FIG. 4

| DIR (Defect/100 phrs) | 1.82 |
|---|---|

| Defect introduced Stage | Defect count |
|---|---|
| Requirements | 13 |
| IA | 8 |
| HLD | 4 |
| DLD | 76 |
| Coding | 81 |
| Total | 182 |

| Defect detected stage | Defect count |
|---|---|
| HLD | 4 |
| DLD | 69 |
| Coding | 38 |
| Unit Testing | 20 |
| Integration testing | 12 |
| System Testing & Performance testing | 25 |
| User acceptance Testing | 6 |
| Implementation defect | 8 |
| Total | 182 |

| Review | Review Efficiency |
|---|---|
| HLD review | 0.021978022 |
| DLD review | 0.387640449 |
| Code review | 0.348623853 |
| Unit Testing | 0.281690141 |
| Integration testing | 0.307692308 |
| System Testing | 0.641025641 |
| User acceptance Testing | 0.428571429 |

| Stage | Deterioration of review efficiency |
|---|---|
| Current Stage | 0.95 |
| Previous 1 Stage | 0.8 |
| Previous 2 Stage | 0.75 |
| Previous 3 Stage | 0.7 |
| Previous 4 Stage | 0.65 |
| Previous 5 Stage | 0 |
| Previous 6 Stage | 0 |

FIG. 5

| Quality Impact | Total defects | | | | | | |
|---|---|---|---|---|---|---|---|
| | | Actual Effort | 10000 | PCR 1 effort | 2500 | PCR 2 effort | 2000 |
| | | | | PCR 1 classification | 4 | PCR 2 classification | 1 |
| | | Initial review effectiveness | | PCR 1 review effectiveness | | PCR 2 review effectiveness | |
| | | HLD review | 0.02 | HLD review | 0.02 | HLD review | 0.02 |
| | | DLD review | 0.39 | DLD review | 0.31 | DLD review | 0.39 |
| | | Code review | 0.35 | Code review | 0.33 | Code review | 0.35 |
| | | Unit Testing | 0.28 | Unit Testing | 0.28 | Unit Testing | 0.28 |
| | | Integration testing | 0.31 | Integration testing | 0.31 | Integration testing | 0.31 |
| | | System Testing | 0.64 | System Testing | 0.64 | System Testing | 0.64 |
| | | User acceptance Testing | 0.43 | User acceptance Testing | 0.43 | User acceptance Testing | 0.43 |
| 45.00% | 263.90 | Total Actual defect | 182.00 | PCR 1 Total defect | 45.50 | PCR 2 Total defect | 36.40 |
| 38.75% | 5.55 | HLD review defect Initial | 4.00 | HLD review defect PCR 1 | 0.75 | HLD review defect PCR 2 | 0.80 |
| 40.11% | 96.68 | DLD review defect Initial | 69.00 | DLD review defect PCR 1 | 13.88 | DLD review defect PCR 2 | 13.80 |
| 46.91% | 55.82 | Code review defect Initial | 38.00 | Code review defect PCR 1 | 10.22 | Code review defect PCR 2 | 7.60 |
| 20.00% | 24.00 | Unit Testing defect Initial | 20.00 | Unit Testing defect PCR 1 | 0.00 | Unit Testing defect PCR 2 | 4.00 |
| 40.00% | 10.98 | Integration testing defect Initial | 7.85 | Integration testing defect PCR 1 | 0.00 | Integration testing defect PCR 2 | 3.14 |
| 0.00% | 0.00 | System Testing defect Initial | 0.00 | System Testing defect PCR 1 | 0.00 | System Testing defect PCR 2 | 0.00 |
| 0.00% | 0.00 | UAT defect Initial | 0.00 | UAT defect PCR 1 | 0.00 | UAT defect PCR 2 | 0.00 |
| 64.21% | 70.86 | Implementation defect Initial | 43.15 | Implementation defect PCR 1 | 20.65 | Implementation defect PCR 2 | 7.06 |

FIG. 6

METHODS FOR ASSESSING DELIVERABLE PRODUCT QUALITY AND DEVICES THEREOF

This application claims the benefit of Indian Patent Application Filing No. 3048/CHE/2011, filed Sep. 5, 2011, which is hereby incorporated by reference in its entirety.

FIELD

This technology generally relates to methods and devices for software defect prediction and, more particularly, to methods for quantitatively assessing impact to quality of one or more project change requests.

BACKGROUND

Requirements for software projects and resulting products, such as an application maintenance or development project, often change, from those included in an initial project request (IPR), during the software development life cycle. For example, a requester of software development services may decide the required software product should be modified to include or exclude functionality, for example, as typically set forth in a project change request (PCR) including the associated attributes.

Current methods of assessing impact to quality and risks, as well as predicting defects, of accepting a PCR are unreliable and ineffective, time-consuming, uninformative, and inadequate. Such methods generally include project managers or teams relying on their experience and confidence, for example, as qualitative parameters used to decide whether to accept a PCR.

Unfortunately, such qualitative parameters do not provide an effective measure of overall impact to quality of implementing a PCR and do not provide insight regarding where in the software development life cycle, for example, the software may be exposed to increased risk so that a developer can take proactive measures or mitigate such risks. Moreover, resulting communications to the requester of the software regarding the PCR often do not adequately set expectations regarding risks and impact to quality of implementing the PCR and, further, such communications lacking quantitative analysis and based on qualitative indicators are often ignored.

SUMMARY

A method for assessing software quality including determining with a quality assessment computing apparatus at least one initial project request defect value based on an initial project request effort value and a defect insertion rate, determining with the quality assessment computing apparatus at least one project change request defect value based on a project change request effort value and the defect insertion rate, comparing with the quality assessment computing apparatus at least one project change request defect value to at least one initial project request defect value, and providing with the quality assessment computing apparatus a quality impact value based on the result of the comparison.

A non-transitory computer readable medium having stored thereon instructions for assessing deliverable product quality comprising machine executable code which when executed by at least one processor, causes the processor to perform steps including determining at least one initial project request defect value based on an initial project request effort value and a defect insertion rate, determining at least one project change request defect value based on a project change request effort value and the defect insertion rate, comparing at least one project change request defect value to at least one initial project request defect value, and providing a quality impact value based on the result of the comparison.

A deliverable project quality assessment computing apparatus includes one or more processors, a memory coupled to the one or more processors which are configured to execute programmed instructions stored in the memory including determining at least one initial project request defect value based on an initial project request effort value and a defect insertion rate, determining at least one project change request defect value based on a project change request effort value and the defect insertion rate, comparing at least one project change request defect value to at least one initial project request defect value, and providing a quality impact value based on the result of the comparison.

This technology provides a number of advantages including providing more efficient and effective methods and systems to predict defects and quantitatively assess impact to quality of a software deliverable product due to a project change request. With this technology, more informed decisions can be made regarding acceptance or rejection of a project change request as a plurality of factors size of the project change request, software development life cycle stage in which the project change request is introduced, complexity of the project change request, requirement status, code status, previous software development life cycle stage not executed with respect to the project change request, subsequent software development life cycle stage that will not be executed with respect to the project change request, and maturity of the initial project request are quantitatively analyzed to arrive at a quality impact value.

The quality impact value allows a software developer or manager to quickly and effectively dispose of a project change request based on a quantitative assessment, rather than the qualitative, more time-consuming, and less accurate methods currently used in the industry, resulting in higher quality deliverable products. Further, this technology helps mitigate risks to deliverable product quality by identifying for a software developer or manager the software development life cycle stage(s) most likely to introduce defects as well as provide the requester of the project change request with a quantitative assessment of impact to quality in order to appropriately set expectations regarding the deliverable product.

BRIEF DESCRIPTION OF THE DRAWINGS

FIG. 4 is a table showing exemplary initial project request and project change request effort values and stages performed as well as exemplary project change request names and recommendations;

FIG. 5 is a table showing exemplary defect counts, review efficiency values and deterioration of review efficiency values; and FIG. 6 is a table showing exemplary initial project request and project change request defect values as well as total defect and impact on quality values.

DETAILED DESCRIPTION

Figure 1:
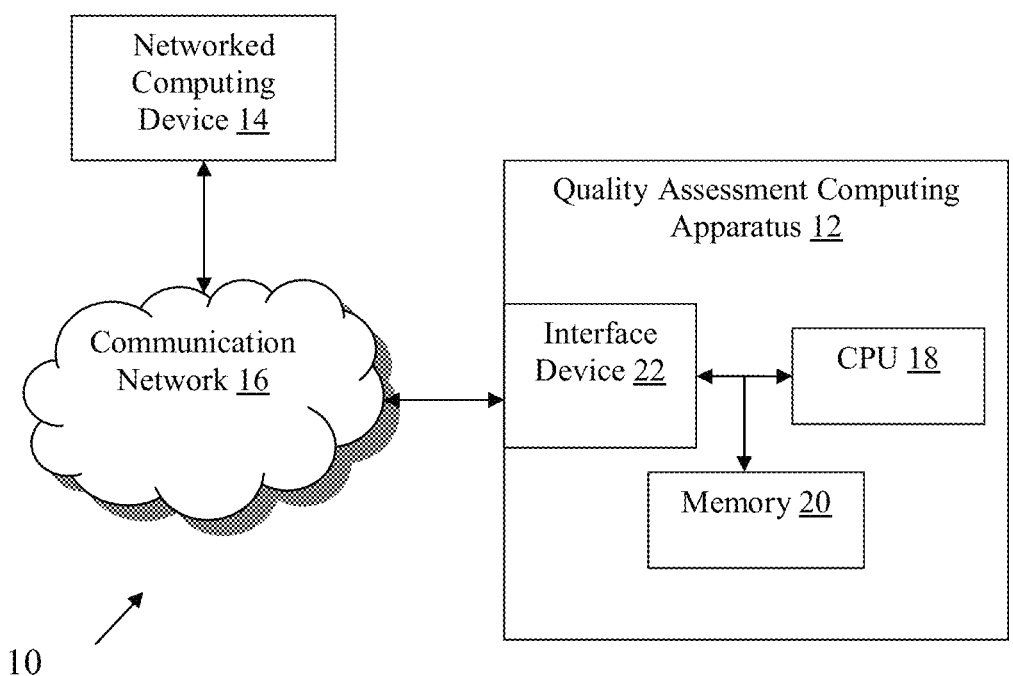
FIG. 1 is an environment with an exemplary secure authentication computing apparatus.

An environment 10 with an exemplary quality assessment computing apparatus 12 is illustrated in FIG. 1. The environment 10 includes the quality assessment computing apparatus 12 and a networked computing device 14, coupled together by one or more communication networks, although this environment can include other numbers and types of systems, devices, components, and elements in other configurations, such as multiple numbers of each of these apparatuses and devices. This technology provides a number of advantages including providing more efficient and effective methods and systems to predict defects and quantitatively assess impact to quality of a software deliverable product due to a project change request (PCR). As used herein, a defect is any fault, bug, imperfection, and/or flaw, for example, affecting software functionality and performance.

The quality assessment computing apparatus 12 includes a central processing unit (CPU) or processor 18, a memory 20, and an interface device 22 which are coupled together by a bus or other link, although other numbers and types of systems, devices, components, and elements in other configurations and locations can be used. The processor 18 in the quality assessment computing apparatus 12 executes a program of stored instructions for one or more aspects of the present technology as described and illustrated by way of the examples herein, although other types and numbers of processing devices and logic could be used and the processor could execute other numbers and types of programmed instructions.

The memory 20 in the quality assessment computing apparatus 12 stores these programmed instructions for one or more aspects of the present technology as described and illustrated herein. The memory 20 can also be configured to store historical, prior precedence, and/or empirical performance, quality, or defect information, or calculated index data, in a database as associated with initial project request (IPR) requirement(s) and/or attribute(s). However, some or all of the programmed instructions and database could be stored and executed elsewhere such as in memory (not shown) of networked computing device 14, for example.

In such a system, the interface device 22 of the quality assessment computing apparatus 12 can be configured to operatively couple and communicate between the quality assessment computing apparatus 12 and the networked computing device via the communications network 16, although other types and numbers of communication networks or systems with other types and numbers of connections and configurations can be used. By way of example only, the communications network could use TCP/IP over Ethernet and industry-standard protocols, including NFS, CIFS, SOAP, XML, LDAP, and/or SNMP, although other types and numbers of communication networks, such as a direct connection, a local area network, a wide area network, modems and phone lines, e-mail, and wireless communication technology, each having their own communications protocols, can be used.

A variety of different types of memory storage devices, such as a random access memory (RAM) or a read only memory (ROM) in the system 12 or a floppy disk, hard disk, CD ROM, DVD ROM, or other computer readable medium which is read from and written to by a magnetic, optical, or other reading and writing system that is coupled to the processor 18 in the quality assessment computing apparatus 12, can be used for the memory 20 in the quality assessment computing apparatus 12.

Although examples of the quality assessment computing apparatus 12 are described herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples may also be embodied as a computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 2:
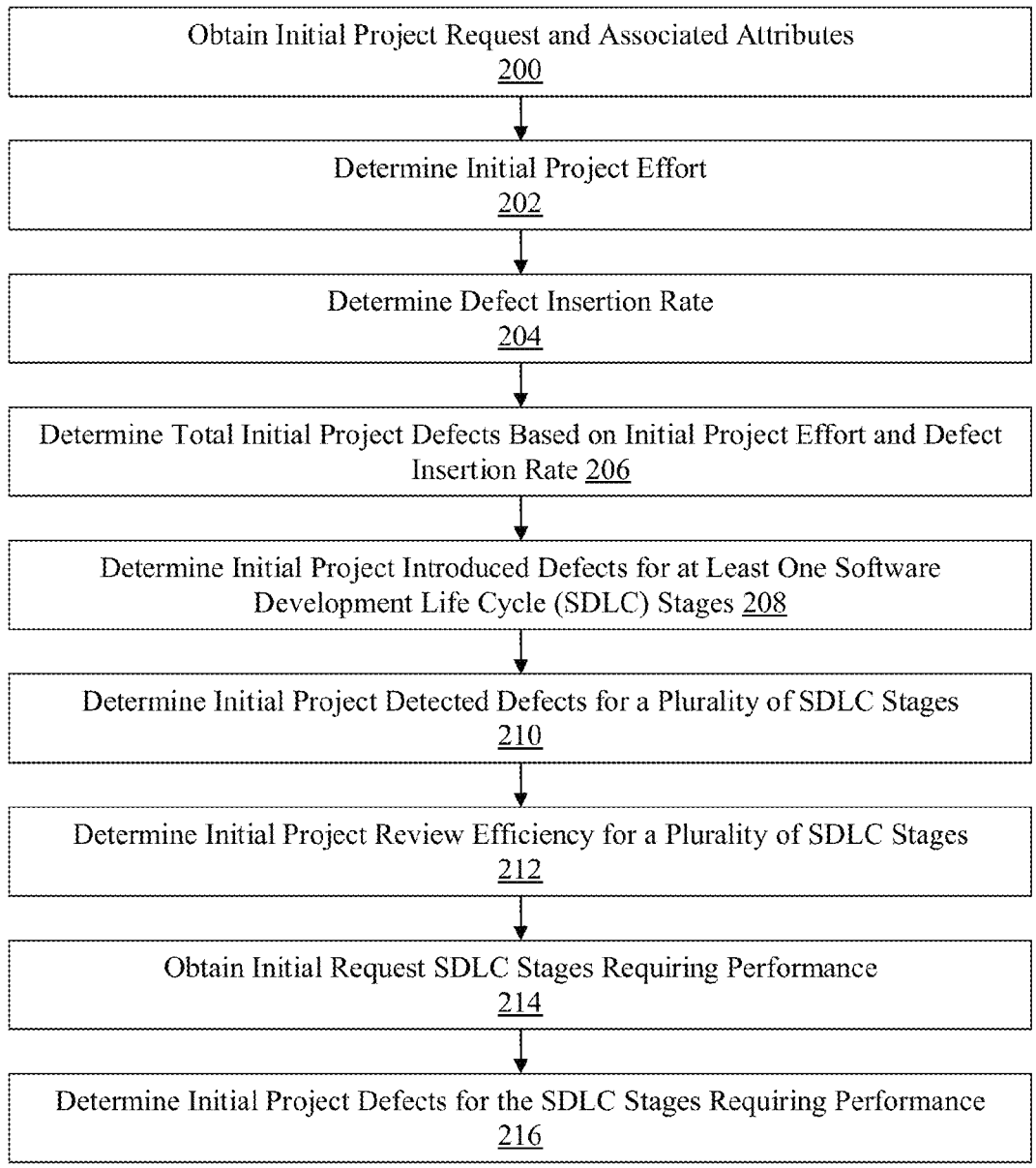
FIG. 2 is a flow chart of an exemplary method for quantitatively assessing software product defects.

An exemplary method for quantitatively assessing impact to deliverable product quality of accepting a PCR will now be described with reference to FIG. 2. In step 200, the quality assessment computing apparatus 12 receives from a user a plurality of IPR attributes associated with an IPR including functionality requirements, implementation requirements, and time to complete the project, for example, such as by user interaction with a user interface device (not shown) and graphical user interface (not shown).

At step 202, the quality assessment computing apparatus 12 determines an IPR effort value based on the IPR attributes and the historical, prior precedence, and/or empirical project data stored in memory 20. The memory 20 can include a database, for example, of empirical project data associated with prior software development project requests and/or attributes. Data including size of project, length of project, type and quantity of defects introduced and/or detected at each software development life cycle (SDLC) stage, total defects throughout the SDLC, and total defects in the deliverable product, for example. The memory 20 can further include corresponding data for a plurality of PCRs.

Accordingly, the IPR effort value can be a number of programmer hours and can be determined at step 202 based on a comparison to prior projects of similar scope, for example, based on the empirical project data stored in the memory 20. Alternatively, the IPR effort value can be an index value or any other indicator of relative project size and/or effort required to complete.

At step 204, the quality assessment computing apparatus 12 determines a defect insertion rate which can also be based on the empirical project data stored in the memory 20. For example, the defect insertion rate can be a ratio of the number of defects introduced per programmer hour. In some exemplary embodiments, the defect insertion rate is calculated based on the total project effort values and the total defects for all projects included in the database of the memory 20. In other exemplary embodiments, the defect insertion rate is calculated based on effort and defect values for prior projects having a shared characteristic with the IPR such as a shared block of code, module, or functional requirement.

At step 206, the quality assessment computing apparatus 12 calculates the total IPR defects based on the IPR effort and defect insertion rate values determined based on IPR attributes.

At step 208, the quality assessment computing apparatus 12 determines an IPR introduced defect value for at least one SDLC stage, wherein the sum of the introduced defect values equals the total IPR defect value calculated at step 206. Exemplary SDLC stages include high level design (HLD), detail or low level design (DLD), coding, unit testing (UT), integration testing (IT), system testing (ST), and user acceptance testing (UAT). Accordingly, in some embodiments, an IPR introduced defect value is determined only for SDLC stages likely to introduce defects such as low level design and coding, for example, as opposed to a testing stage in which few or no defects are likely to be inserted. In some embodiments, the distribution of IPR introduced defects among SDLC stages is determined based on empirical project data stored in a database in the memory 20.

At step 210, the quality assessment computing apparatus 12 determines an IPR detected defect value for at least one SDLC stage, wherein the sum of the detected defect values equals the total IPR defect value and the sum of the IPR introduced defect values. In some embodiments, the distribution of IPR detected defect values among SDLC stages is determined based on empirical project data stored in a database in the memory 20.

At step 212, the quality assessment computing apparatus 12 calculates an IPR review efficiency value for a plurality of SDLC stages as the ratio of the IPR detected defect value for each SDLC stage and the sum of the IPR detected defect value at each SDLC stage and IPR detected value for each subsequent SDLC stage. Accordingly, the review efficiency value for each stage is a measure of the effectiveness of detecting any remaining defects at each SDLC stage.

At step 214, the quality assessment computing apparatus 12 receives information regarding SDLC stages requiring performance with respect to the IPR request and, inherently, those IPR SDLC stages likely to be skipped.

At step 216, the apparatus calculates an IPR defect value for the SDLC stages requiring performance by multiplying the IPR review efficiency values for each respective stage, as calculated at step 212, by the total IPR defect value less the sum of the IPR defect values for any previous SDLC stage. Accordingly, the apparatus is configured to calculate the number of likely defects (IPR defect values) for each SLDC stage requiring performance and thereby account for those SLDC stages previously or likely to be skipped.

Figure 3:
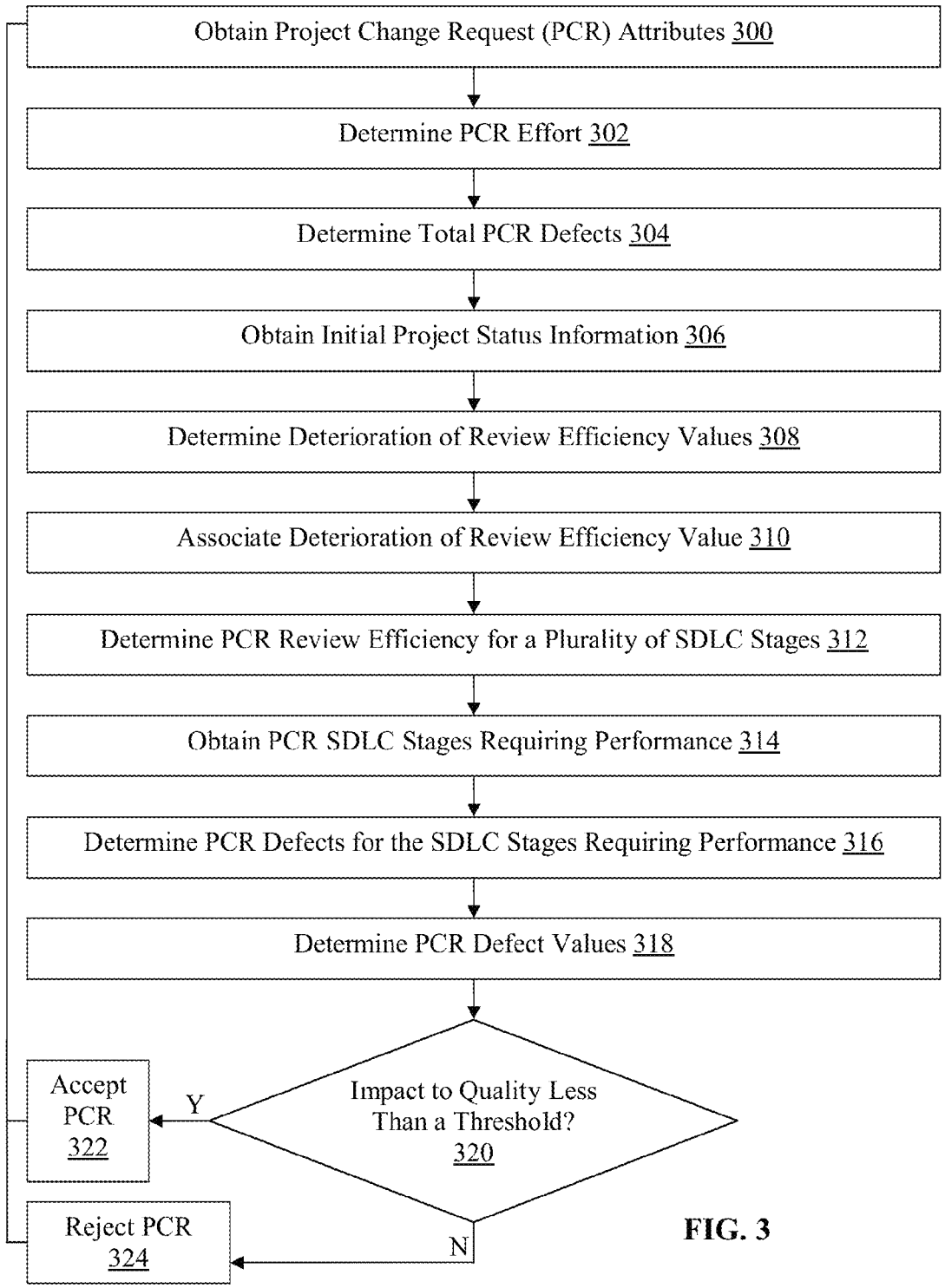
FIG. 3 is a flow chart of an exemplary method for quantitatively assessing software product defects introduced due to a project change request.

Referring to FIG. 3, at step 300, the quality assessment computing apparatus 12 is configured to receive from a user PCR attributes associated with a PCR including functionality and implementation modifications to the IPR, for example. At step 202, the quality assessment computing apparatus 12 determines a PCR effort value based on the IPR attributes and the historical and/or empirical project data stored in memory 20.

At step 304, the quality assessment computing apparatus 12 is configured to calculate the total PCR defect value by multiplying the PCR effort value determined at step 302 by the defect insertion rate determined at step 204. In some embodiments, the quality assessment computing apparatus 12 is configured to calculate a ratio of the total PCR defect value to the total IPR defect value and compare the calculated ratio with a predetermined, or preselected by the user, threshold quality impact value. Based on the comparison, the apparatus 12 can be configured to suggest acceptance of or rejection of the PCR. Accordingly, in these embodiments, the apparatus 12 utilizes empirical project data stored in memory 20 to determine a defect insertion rate and an effort value for both the IPR and the PCR. Based on the quality impact as reflected in the comparison of the calculated total defect value of the PCR and total defect value of the IPR, a decision may be made to disregard or reject the proposed PCR. Such analysis based on empirical project data considers the size and complexity of the PCR and advantageously provides a quantitative assessment of PCR impact to quality.

In other embodiments, as shown in FIG. 3 and described in more detail below with respect to FIGS. 4-6, the apparatus is configured to consider a plurality of other factors including software development life cycle stage in which the PCR is introduced, requirement status including whether the PCR results in a new requirement or a modification to a requirement included in the IPR, code status including whether the PCR requires new software code or whether existing code can be reused, previous software development life cycle stage(s) not executed with respect to the PCR, subsequent software development life cycle stage(s) that will not be executed with respect to the PCR, testing and/or development team capability, and process maturity of the IPR and/or PCR development team prior to suggesting a disposition of the PCR in order to better inform both the requesting entity and the software development entity, as well as to allow developers and managers to identify and mitigate defect risk. Such factors can be determined with reference to the prior precedence and/or empirical data stored in memory 20 and applied based on an index value, for example.

Accordingly, at step 306 the quality assessment computing apparatus 12 receives from a user initial project status information such as the SDLC stage of the initial project. At step 308, the quality assessment computing apparatus 12 determines a deterioration of review efficiency value for a plurality of SDLC stages and based on empirical project data stored in the memory 20. The deterioration of review efficiency value is an indicator of diminishing effectiveness of defect detection as the IPR advances in the SDLC. At step 310, the apparatus 12 associates a deterioration of review efficiency value with the initial project status received at step 306.

At step 312, the quality assessment computing apparatus 12 calculates a PCR review efficiency value for a plurality of software development life cycle stages as the product of the IPR review efficiency value at each respective SDLC stage and the deterioration of review efficiency value associated with the received initial project status. Accordingly, the calculated PCR review efficiency values reflect the distribution of the review efficiency values as determined by empirical project data stored in the memory 20 as modified to reflect the SDLC stage in which the PCR is received. Accordingly, in the case of a PCR introduced at any SDLC stage subsequent to the initial SDLC stage, the resulting PCR efficiency values will be modified relative to the IPR efficiency values in order to alter the defect distribution to more accurately represent the later introduction of the PCR.

At step 314, the quality assessment computing apparatus 12 receives information from a user regarding any PCR software development life cycle stages requiring performance and, inherently, those stages likely to be skipped.

At step 316, the quality assessment computing apparatus 12 calculates a PCR defect value for each PCR SDLC stage requiring performance by multiplying the PCR review efficiency values for each respective stage, as calculated at step 312, by the total IPR defect value less the sum of the IPR defect values for any previous SDLC stage. Accordingly, the apparatus 12 is configured to calculate PCR defect values for each PCR SLDC stage requiring performance and thereby account for those PCR SLDC stages likely to be skipped.

At step 320, the quality assessment computing apparatus 12 compares the PCR defect values calculated at step 318 with the IPR defect values to determine whether to suggest acceptance or rejection of the PCR. In some embodiments, the apparatus 12 is configured to receive a threshold value from a user and compare the threshold value to the difference in the IPR and PCR defect values for one or more SDLC stages in order to recommend acceptance or rejection of the PCR. In other embodiments, the apparatus 12 is configured to receive a threshold percentage value which is compared to a percentage impact to quality value calculated for one or more SDLC stage as the difference between the sum of the each respective PCR defect value divided by the corresponding IPR defect value.

Referring to FIGS. 4-6, an exemplary operation of the quality assessment computing apparatus 12 is described with reference to the tables shown therein. In the exemplary operation, the IPR effort value is 10,000 as determined based on a comparison of IPR attributes received from a user to empirical project data. In this exemplary operation, the apparatus 12 has received two PCRs and associated attributes from a user and determined, based on empirical project data, PCR 1 has an effort value of 2500 and PCR 2 has an effort value of 2000. The apparatus 12 has further determined based on empirical project data, the defect insertion rate is 1.82 defects for every 100 programmer hours. Accordingly, in this exemplary operation, the total IPR defect value is 182 and the apparatus has determined, based on empirical project data, the distribution of IPR introduced defect values as 13, 8, 4, 76, and 81 for four exemplary SDLC stages as shown in FIG. 5. Also based on empirical project data, the apparatus 12 has determined that the distribution of IPR detected defects is 4, 69, 38, 20, 12, 25, 6, and 8 for eight SDLC stages as shown in FIG. 5.

The apparatus 12 has calculated the IPR review efficiency at a plurality of SDLC stages by dividing the IPR detected defect value at the corresponding SDLC stage by the sum of the IPR detected defect value at the corresponding SDLC stage and any subsequent IPR detected defect values. For example and as shown in FIG. 6, the IPR review efficiency at the system testing stage is approximately 0.64 calculated as the IPR detected defect value at the system testing SDLC stage divided by the sum of the subsequent IPR detected defect values or 25/39.

The apparatus 12 has received from a user the IPR SDLC stages requiring performance as indicated in FIG. 4 in row 3, columns 5-11. Accordingly, in this exemplary operation, the HLD through UT SLDC stages require performance. The apparatus 12 can be further configured to receive IPR SDLC stages requiring partial performance such as the IT SDLC stage in this exemplary operation as indicated by the 0.5 value in row 3, column 9 of FIG. 5.

The apparatus 12 has calculated an IPR defect value for the SDLC stages requiring performance, as indicated in FIG. 6, by multiplying the IPR review efficiency values for each respective SDLC stage by the total IPR defect value less the sum of the IPR defect values for any previous SDLC stage. For example, the IPR defect value for the DLD SDLC stage is the product of the IPR review efficiency value (approximately 0.39) for the DLD SDLC stage and the total IPR defect value (182) less the sum of the IPR defect values for any previous SDLC stage (4) or approximately 69 as indicated in row 13, column 4 of FIG. 6.

Upon receiving PCR attributes from a user, the apparatus 12 determined a PCR effort value and a total PCR defect value as described in detail above. The apparatus 12 received from a user initial project status information for each PCR as indicated in the column 4 of FIG. 4. Accordingly, when PCR 1 was received, the IPR SDLC stage was "coding" and when PCR 2 was received, the IPR SDLC stage was "requirements."

The apparatus 12 determined deterioration of review efficiency values, based on empirical project data, and associated the deterioration of PCR review efficiency values with the initial project status information. The apparatus 12 then calculated the PCR review efficiency value for each SDLC stage by multiplying the previously calculated IPR review efficiency values by the associated deterioration of PCR review efficiency value. For example, as shown in FIG. 6, the PCR review efficiency value for the DLD SDLC stage is 0.31 as calculated by multiplying the deterioration of PCR review efficiency value (0.8) associated with the "coding" IPR status information by the previously calculated IPR review efficiency value for the DLD SDLC stage (approximately 0.39).

The apparatus 12 then received from a user the PCR SDLC stages requiring performance as indicated at row 5, columns 5-11 of FIG. 4, for example, with respect to PCR 1. With the PCR SDLC stages requiring performance information, the apparatus 12 calculated the PCR defect values for the SDLC stages requiring performance. For example, with respect to PCR 1, the user indicated only the first three SDLC stages require performance and the apparatus 12 calculated PCR defect values as 13.88 for example with respect to the DLD SDLC stage. The PCR defect values were calculated by multiplying the PCR review efficiency value for each SDLC stage (e.g. approximately 0.31 with respect to the DLD SDLC stage) by the total IPR defect value (45.50) less the sum of the IPR defect values for any previous stage (0.75).

In the exemplary embodiment described with reference to FIG. 6, the apparatus 12 calculated a percentage impact to quality value for each SDLC stage as the sum of the respective PCR defect value divided by the IPR defect value. Accordingly, the DLD SDLC stage PCR defects total 27.68 and the IPR DLD SDLC stage total 69 which when divided and the result multiplied by 100 results in a percentage value of 40.11. The user, and/or apparatus based on a predetermined threshold value, can then interpret the impact quality percentage value so as to reject or accept the PCR. The user can further determine which SDLC stages are most likely to introduce defects, based on the quantitative analysis described, and mitigate such risks, if desired.

Accordingly, as illustrated and described with the example herein this technology provides efficient and effective methods and systems to predict defects and quantitatively assess impact to quality of a software deliverable product due to one or more PCRs. Additionally, the technology utilizes empirical data and a plurality of defect factors to provide a quantitative assessment allowing software developers to better communicate risks to clients or procuring entities as well as proactively identify and mitigate the introduction of defects.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for assessing software quality, comprising:
   determining, by a quality assessment computing apparatus, at least one initial project request defect value based on an initial project request effort value, a defect insertion rate, and a deterioration of review efficiency value, wherein the deterioration of review efficiency value indicates the diminishing effectiveness of defect detection;
   obtaining, by the quality assessment computing apparatus, a plurality of project change request attributes;
   determining, by the quality assessment computing apparatus, at least one project change request defect value based on a project change request effort value and the defect insertion rate, wherein the project change request effort value is based on the project change request attributes;

calculating, by the quality assessment computing apparatus, a ratio of the at least one determined initial project request defect value to the at least one project change request defect value;

comparing, by the quality assessment computing apparatus, the calculated ratio of the at least one project change request defect value and the at least one initial project request defect value, to a threshold quality impact value; and providing, by the quality assessment computing apparatus, a quality impact value based on the result of the comparison.

2. The method as set forth in claim 1 further comprising:
obtaining by the quality assessment computing apparatus a plurality of initial project request attributes; and
determining by the quality assessment computing apparatus the initial project request effort value based on at least the obtained initial project request attributes.

3. The method of claim 1 further comprising:
determining by the quality assessment computing apparatus at least one of an initial project request introduced defect value, an initial project request detected defect value, an initial project request review efficiency value, and the deterioration of review efficiency value for at least one software development life cycle stage;
obtaining by the quality assessment computing apparatus at least one of initial project request software development life cycle stages requiring performance and project change request software development life cycle stages requiring performance;
wherein the at least one initial project request defect value includes an initial project request defect value for the initial project request software development life cycle stages requiring performance and the at least one project change request defect value includes a project change request defect value for the project change request software development life cycle stages requiring performance.

4. The method of claim 1 wherein the project change request defect values are determined based on at least one project change request defect parameter selected from at least one of a size of the project change request, software development life cycle stage in which a project change request is introduced, complexity of a project change request, requirement status, code status, previous software development life cycle stage not executed with respect to a project change request, subsequent software development life cycle stage that will not be executed with respect to the project change request, development team capability, testing team capability, process maturity of an initial project request development team, or process maturity of a project change request development team.

5. A non-transitory computer readable medium having stored thereon instructions for assessing software quality comprising machine executable code which when executed by at least one processor, causes the processor to perform steps comprising:
determining at least one initial project request defect value based on an initial project request effort value, a defect insertion rate, and a deterioration of review efficiency value, wherein the deterioration of review efficiency value indicates the diminishing effectiveness of defect detection;
obtaining a plurality of project change request attributes;

determining at least one project change request defect value based on a project change request effort value and the defect insertion rate, wherein the project change request effort value is based on the project change request attributes;

calculating a ratio of the at least one determined initial project request defect value to the at least one project change request defect value;

comparing the calculated ratio of the at least one project change request defect value and the at least one initial project request defect value, to a threshold quality impact value; and providing a quality impact value based on the result of the comparison.

6. The medium as set forth in claim 5 further having stored thereon instructions that when executed by the processor causes the processor to perform steps further comprising:
obtaining a plurality of initial project request attributes; and
determining the initial project request effort value based on at least the obtained initial project request attributes.

7. The medium as set forth in claim 5 further having stored thereon instructions that when executed by the processor causes the processor to perform steps further comprising:
determining at least one of an initial project request introduced defect value, an initial project request detected defect value, an initial project request review efficiency value, and the deterioration of review efficiency value for at least one software development life cycle stage;
obtaining at least one of initial project request software development life cycle stages requiring performance and project change request software development life cycle stages requiring performance;
wherein the at least one initial project request defect value includes an initial project request defect value for the initial project request software development life cycle stages requiring performance and the at least one project change request defect value includes a project change request defect value for the project change request software development life cycle stages requiring performance.

8. The medium as set forth in claim 5 wherein the project change request defect values are determined based on at least one project change request defect parameter selected from at least one of a size of a project change request, software development life cycle stage in which a project change request is introduced, complexity of a project change request, requirement status, code status, previous software development life cycle stage not executed with respect to a project change request, subsequent software development life cycle stage that will not be executed with respect to a project change request, development team capability, testing team capability, process maturity of an initial project request development team, or process maturity of a project change request development team.

9. A software quality assessment computing apparatus comprising:
one or more processors;
a memory coupled to the one or more processors which are configured to be capable of executing programmed instructions comprising and stored in the memory to:
determine at least one initial project request defect value based on an initial project request effort value, a defect insertion rate, and a deterioration of review efficiency value, wherein the deterioration of review efficiency value indicates the diminishing effectiveness of defect detection;

obtain a plurality of project change request attributes;
determine at least one project change request defect value based on a project change request effort value and the defect insertion rate, wherein the project change request effort value is based on the project change request attributes;
calculate a ratio of the at least one determined initial project request defect value to the at least one project change request defect value;
compare the calculated ratio of the at least one project change request defect value and the at least one initial project request defect value, to a threshold quality impact value; and
provide a quality impact value based on the result of the comparison.

10. The apparatus as set forth in claim 9 wherein the one or more processors is further configured to be capable of executing programmed instructions further comprising and stored in the memory to:
obtain a plurality of initial project request attributes; and
determine the initial project request effort value based on at least the obtained initial project request attributes.

11. The apparatus as set forth in claim 9 wherein the one or more processors is further configured to be capable of executing programmed instructions further comprising and stored in the memory to:
determine at least one of an initial project request introduced defect value, an initial project request detected defect value, an initial project request review efficiency value, and the deterioration of review efficiency value for at least one software development life cycle stage;
obtain at least one of initial project request software development life cycle stages requiring performance and project change request software development life cycle stages requiring performance;
wherein the at least one initial project request defect value includes an initial project request defect value for the initial project request software development life cycle stages requiring performance and the at least one project change request defect value includes a project change request defect value for the project change request software development life cycle stages requiring performance.

12. The apparatus as set forth in claim 9 wherein the project change request defect values are determined based on at least one project change request defect parameter selected from at least one of a size of a project change request, software development life cycle stage in which a project change request is introduced, complexity of a project change request, requirement status, code status, previous software development life cycle stage not executed with respect to a project change request, subsequent software development life cycle stage that will not be executed with respect to a project change request, development team capability, testing team capability, process maturity of an initial project request development team, or process maturity of a project change request development team.

* * * * *